March 6, 1934.　　　M. R. SIMON ET AL　　　1,949,922
ANTISKIDDING DEVICE
Filed Jan. 18, 1933　　　2 Sheets-Sheet 1
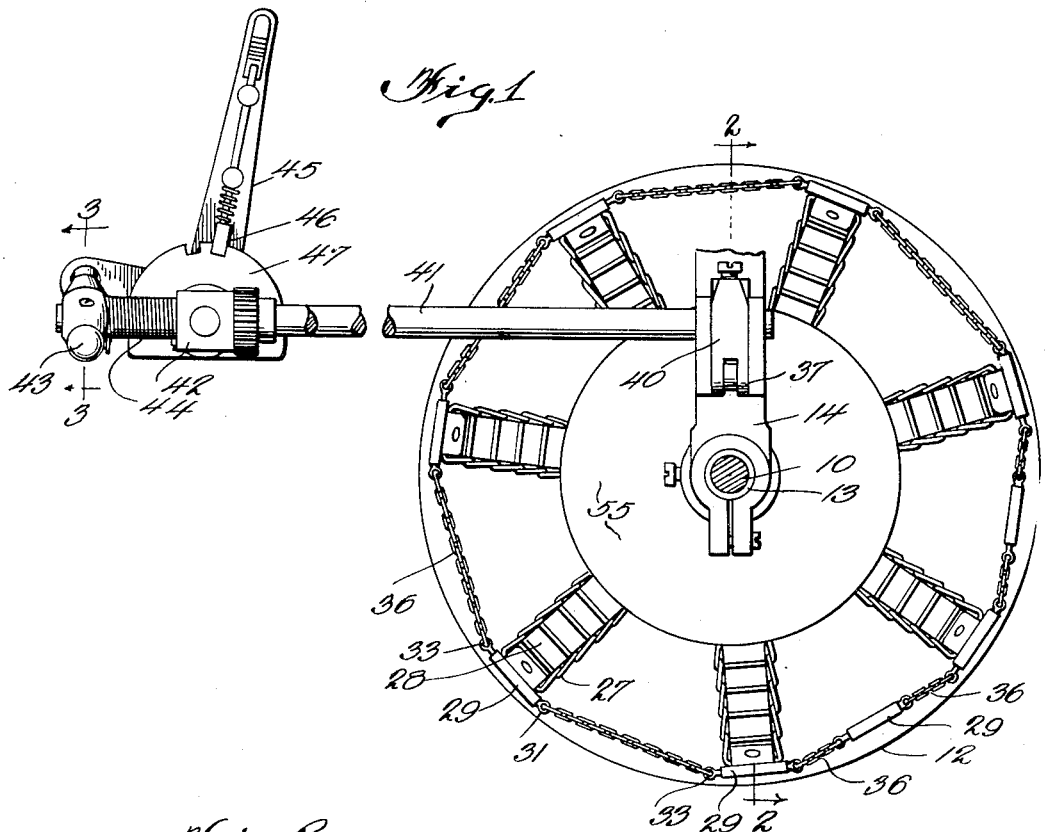
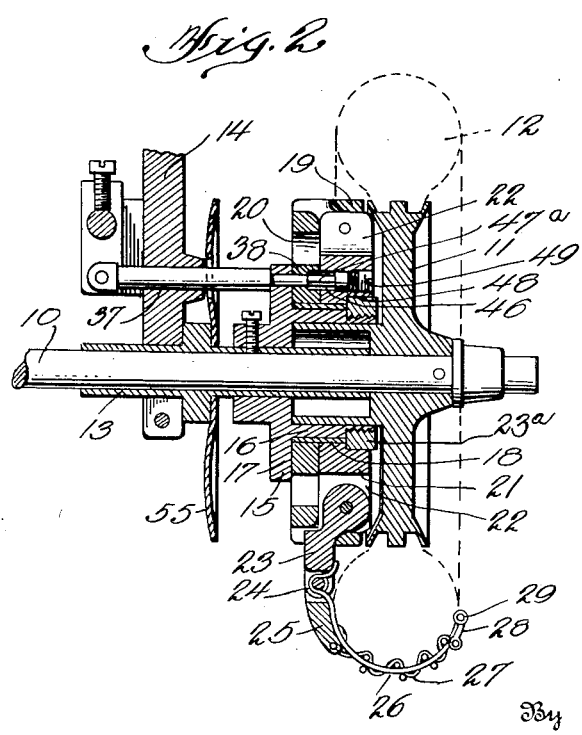
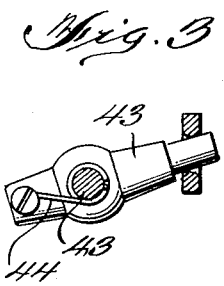
Inventors
Mortimer R. Simon
Louis Levy
J. Kaplan
By
Attorney March 6, 1934.  M. R. SIMON ET AL  1,949,922
ANTISKIDDING DEVICE
Filed Jan. 18, 1933    2 Sheets-Sheet 2
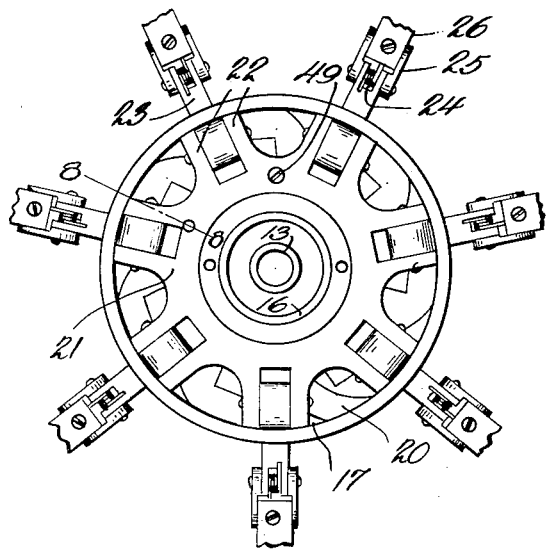
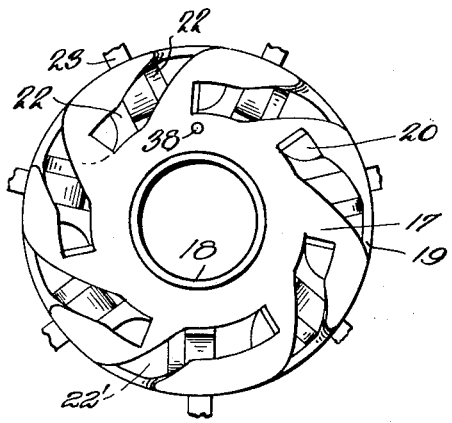
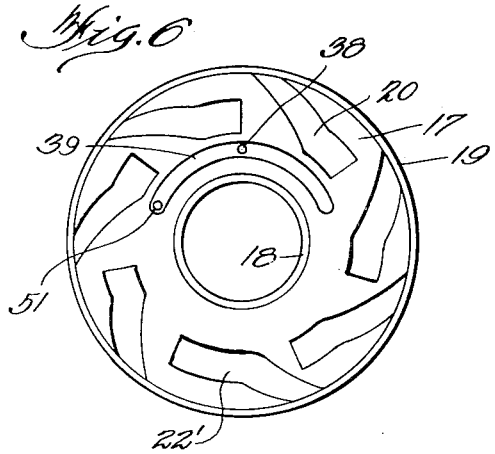
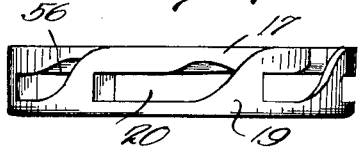
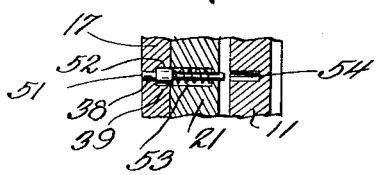
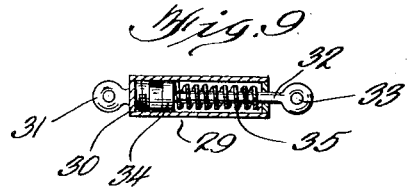
Inventors
Mortimer R. Simon
Louis Levy
J. Kaplan
By
Attorney Patented Mar. 6, 1934

1,949,922

UNITED STATES PATENT OFFICE 1,949,922

ANTISKIDDING DEVICE

Mortimer R. Simon and Louis Levy, Passaic, N. J.

Application January 18, 1933, Serial No. 652,362

8 Claims. (Cl. 152—14)

This invention relates to automobiles and has special reference to a tire chain attachment for automobiles.

One important object of the invention is to provide a novel and improved device of this character permanently carried by the automobile and arranged to be placed on and removed from the tire in a simple and expeditious manner.

A second important object of the invention is to provide a novel device of this kind wherein the tire chains will be held from rotative movement when off the tire and will rotate with the tire when on the tire.

A third important object of the invention is to provide a novel mechanism for moving the chains into and out of operative position on the tire.

A fourth important object of the invention is to provide a simple and efficient manual control for the device.

A fifth important object of the invention is to provide a novel device of this character wherein, when the device is manually controlled to operate, movement of the automobile in one direction will effect the placing of the chains in operative position and movement of the automobile in the other direction will effect placing of the chains in normal position of rest.

A sixth important object of the invention is to provide a device of this character which may be operated by fluid pressure or by electro-magnetic means as well as manually.

With the above and other objects in view, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is an elevation showing the general assembly of the invention as applied to the right rear wheel of an automobile, the view being taken from the longitudinal center line of the automobile and looking outwardly.

Figure 2 is a section on the line 2—2 of Figure 1, certain parts behind the section plane being omitted to avoid confusion.

Figure 3 is a somewhat enlarged section on the line 3—3 of Figure 1.

Figure 4 is an assembly view of the camming device and chain support from the outer side, the chains being broken away.

Figure 5 is a somewhat similar view to Figure 4 but taken from the inside and showing only the cam member, chain arm support and portions of the chain arms or rockers.

Figure 6 is a detail elevation of the cam member from its outer side.

Figure 7 is an edge view of the cam member.

Figure 8 is a detail section on the line 8—8 of Figure 4 and also showing the wheel center.

Figure 9 is a longitudinal section through a chain tensioning device used herein.

In the embodiment of the invention as here disclosed the device has been illustrated in its application to one wheel (the right rear wheel) of an automobile but it is, of course, to be understood that it is also to be applied at least to the remaining rear wheel and may be arranged for use on all four wheels if desired. Also all those parts of the automobile not directly related to the invention have been omitted from the present disclosure.

In these drawings there is shown an axle 10 on which is pinned or otherwise fixed a wheel center 11 provided with the usual pneumatic tire 12. The axle 10 passes through a sleeve or bushing 13 which is clamped in the lower end of a bracket 14 suitably attached to some convenient part of the automobile frame (not shown). Mounted on the sleeve 13 is a disc 15 fixed to the sleeve by suitable set screws as shown. This disk carries a hollow bearing 16 which projects from the outer face of the disc and has its outer end reduced and threaded as shown in Figure 2. A hollow bearing boss 17 is formed on the inner face of the wheel center and is held in the bearing 16. Mounted on the bearing 16 is a cam member having a central disk or body 17 provided with a liner 18 which fits on the bearing 16 and projects outwardly to provide a bearing for a certain chain arm carrier presently to be described. A flange 19 extends annularly from the outer face of the disk 17 at the periphery thereof and in the disk 17 and flange 19 are provided cam slots 20 each of which has one end in the disk part 17 of the cam member and its other end in the flange 19 of this cam member.

Mounted on the projecting portion of the sleeve 18 within the flange 19 is a chain arm carrier having a central portion 21 from which project pairs of spaced lugs 22 and between each pair of these lugs is pivoted a chain arm 23 which projects through a respective slot 20. Since the carrier is revoluble with respect to the cam member it is evident that the arms 23 will project radially from the cam member when the arms are in the flange portions of the slots 20 and will project substantially at right angles to the inner face of the cam member when the arms are at the remaining ends of said slots. Thus by shifting the position of the carrier relative to the cam member the arms are moved from one position to the other. A retaining ring 23a is screwed on the threaded end of the bearing 16 and holds the cam member and carrier in position on the bearing 16 while permitting them to revolve freely thereon. Each of the arms has its free end bifurcated for the reception of the spring 24 of a spring pivot joint which connects an arm extension 25 to the respective arm. Arcuate leaf springs 26 have their inner ends fixedly attached to respective arm extensions 25 and pass between the cross members of chain links 27 each set of which forms a cross-chain also having its inner end attached to the respective arm extension. The free end of each cross-chain and its associated spring are secured to a terminal member 28 carrying a chain tensioning device and between certain of these chain tensioning devices are arranged other chain tensioning devices. Each chain tensioning device (see Figure 9) has a barrel 29 closed at one end by a screw head 30 carrying a fixed eye 31. Through the other end of the barrel extends a shank 32 carrying an eye 33 on its outer end and having a head 34 on its inner end. Between the head 34 and the open end of the barrel is a coiled compression spring 35. Chains 36 connect the tension devices in series as clearly shown in Figure 1. Because of the shape of the springs 26 and of the tension exerted on the chains 36 the cross-chains hug tightly on the tire when in operative position as shown in Figure 2.

In order that the cam member may be held from rotation a cam locking pin 37 extends through the bracket 14 and through a suitable guide opening in the disk 15. In the cam member is an opening 38 which, by rotation of the cam member, may be brought to register with the opening in the disk 15 so that the pin 37 may project into the opening 38 and thus lock the cam member against rotation. The opening 38 lies at the center of an arcuate slot formed in the outer face of the cam member concentric to its center and, when the pin 37 is in locking position, the end of this pin lies flush with the bottom of the slot 39. In order to operate the pin its inner end is connected to the rock arm 40 which is carried by a rock shaft 41 journalled at one end in ears formed on the bracket 14 and journalled adjacent its other end in a bracket 42 secured to the automobile at some point convenient to the operator's seat. A cross-head 43 is fixed on the forward end of the shaft 41 and between this cross-head and the bracket 42 is a torsion spring 44 arranged to urge the pin 37 into protracted position. A bell crank lever 45 has one arm operatively connected with the cross-head 43 and its other and handled arm provided with a latch 46 working over a quadrant 47. By this means the pin 37 may be retracted against the action of the spring 44 and held in retracted position.

When the chains are in operative position it is necessary, during running of the automobile, that the cam member and arm carrier be prevented from rotation with respect to each other and, since the arm carrier and its supported chains must rotate with the wheel, the cam member must be held to rotate with the wheel. To this end the arm carrier 21 is provided with an opening 46 which aligns with the opening 38 when the chains are in operative position as shown in Figure 2. In this opening is a pin 47a which is urged inwardly to move into the opening 38 by a spring 48 arranged between the pin 47a and a screw 49 closing the outer end of the opening 46. It will now be observed that when the pin 37 is protracted the pin 47a cannot engage in the opening 38 but may slide past that opening to allow movement of the arm carrier while the cam member is held stationary but, when the pin 37 is retracted, the pin 47a will enter the opening 38 when aligned therewith, as when the chains are on the tire, and lock the carrier and cam member together.

This device operates to move the chains between operative and normal or rest positions by means of certain rotative movements of the wheel 12 and the manner in which this is effected will now be explained. In the part 21 is a pin opening 50 wherein moves a pin 51 having a collar 52 intermediate its ends and against this collar bears a spring 53 which urges the pin inwardly. This pin is at such distance from the center of the part 21 that it may move into registry with the opening. When not in such registry the outer end of the pin projects outwardly to enter a pin hole 54 in the wheel center 11. Thus when the pin 51 is in outer position the wheel and arm carrier are locked together and when the pin 51 is in its inner position the cam member and wheel carrier are locked together. It is to be noted that the pins 47a and 51 are so spaced about a circular arc that the pin 51 registers with the opening 37 only when the chains are in normal position. A nut or guard 55 is provided to support the cross-chains when in such normal position.

In order to understand the operation let it be supposed that the chains are in operative position as in Figure 2. In this position the pin 47a, while the automobile is running, engages the opening 38 and the pin 51, being out of registry with the opening 38, projects into the pin hole 54. The pin 37 is, of course, retracted during running and is so held by the latch lever and quadrant. If it is desired to remove the chains from the wheel the automobile is stopped and the latch lever released. The pin 37 will now be urged to protracted position and will, in most instances, bear against the inner face of the cam member. The car is now moved slowly forward until the opening 38 aligns with pin 37 whereupon the pin 37 enters the opening 38 and forces out the pin 47a. Further forward movement of the car will move the arm carrier to bring the arms into normal position whereupon the car is stopped and the latch lever moved to retract the pin 37 whereupon the car may be driven and the chains will remain stationary since the pin 51 will have moved into registry with the opening 38 and will drop into the opening and disengage from the pin hole 54, thus permitting the wheel to run free. Obviously the reverse of this operation will effect replacement of the chains to operative position.

It is to be noted that the cam slots are so shaped that the arms do not move between operative and normal positions simultaneously but the one in slot 22' moves after the others have started their movements. This is accomplished by having slot 22' longer than the other slots and also of different angularity and slope.

Bevels 56 are provided at the slot edges to prevent jamming of the parts by mud, snow and the like.

There has thus been provided a highly efficient device of the kind described and for the purpose specified.

It is obvious that changes may be made in the form and construction of the device without departing from the inventive idea. It is not therefore desired to confine the invention to the exact form herein shown and described but it is desired to include all such as come within the scope claimed.

Having described our invention, we claim:

1. In an automobile, the combination with a wheel and its tire; of an arm carrier arranged beside the wheel and coaxial therewith, said arm carrier being supported for rotary movement on its axis, spaced arms pivoted to the peripheral portion of said arm carrier, tire chains carried by the free ends of said arms, a cam member having cam slots through which said arms pass, said member being arranged to rotate on the axis of the arm carrier and the cam slots being arranged to move the arms between normal and operative positions for the chains upon relative movement of the arm carrier and cam member, said cam member having a pin hole therein, a manually controlled pin protractable into said pin hole to lock the cam member from movement and retractable from the pin hole to release the cam member for rotary movement, and means to effect locking of the arm carrier to the wheel whereby the arm carrier will rotate with the wheel.

2. In an automobile, the combination with a wheel and its tire; of an arm carrier arranged beside the wheel and coaxial therewith, said arm carrier being supported for rotary movement on its axis, spaced arms pivoted to the peripheral portion of said arm carrier, tire chains carried by the free ends of said arms, a cam member having cam slots through which said arms pass, said member being arranged to rotate on the axis of the arm carrier and the cam slots being arranged to move the arms between normal and operative positions for the chains upon relative movement of the arm carrier and cam member, said cam member having a pin hole therein, a manually controlled pin protractable into said pin hole to lock the cam member from movement and retractable from the pin hole to release the cam member for rotary movement, a spring pressed pin carried by the arm carrier and registering with the pin hole upon the chains being in operative position, said spring pressed pin being adapted to enter said pin hole and lock the arm carrier and cam member together upon retraction of the manually operated pin, and means to effect locking of the arm carrier to the wheel whereby the arm carrier will rotate with the wheel.

3. In an automobile, the combination with a wheel and its tire; of an arm carrier arranged beside the wheel and coaxial therewith, said arm carrier being supported for rotary movement on its axis, spaced arms pivoted to the peripheral portion of said arm carrier, tire chains carried by the free ends of said arms, a cam member having cam slots through which said arms pass, said member being arranged to rotate on the axis of the arm carrier and the cam slots being arranged to move the arms between normal and operative positions for the chains upon relative movement of the arm carrier and cam member, said cam member having a pin hole therein, a manually controlled pin protractable into said pin hole to lock the cam member from movement and retractable from the pin hole to release the cam member for rotary movement, a spring pressed pin carried by the arm carrier and registering with the pin hole upon the chains being in operative position, said spring pressed pin being adapted to enter said pin hole and lock the arm carrier and cam member together upon retraction of the manually operated pin, and a second spring pressed pin mounted in the arm carrier to move between protracted position in the direction of the wheel and retracted position in the direction of the cam member, said second pin being urged by its spring towards retracted position and adapted to be held protracted by engagement with the cam member and movable with the arm carrier to register with said pin hole upon the chains being in normal position to permit retraction of the pin, said wheel having a pin hole into which the second pin enters in protracted position.

4. In an automobile, the combination with a wheel and its tire; of an arm carrier arranged beside the wheel and coaxial therewith, said arm carrier being supported for rotary movement on its axis, spaced arms pivoted to the peripheral portion of said arm carrier, tire chains carried by the free ends of said arms, said tire chains including cross-chains each having one end pivoted to a respective arm and its other end connected to a chain tensioning device, a leaf spring of arcuate form associated with said cross-chains, other chains connecting said tensioning devices in series, a cam member having cam slots through which said arms pass, said member being arranged to rotate on the axis of the arm carrier and the cam slots being arranged to move the arms between normal and operative positions for the chains upon relative movement of the arm carrier and cam member, and means to effect such relative movement.

5. In an automobile, the combination with a wheel and its tire; of an arm carrier arranged beside the wheel and coaxial therewith, said arm carrier being supported for rotary movement on its axis, spaced arms pivoted to the peripheral portion of said arm carrier, tire chains carried by the free ends of said arms, said tire chains including cross-chains each having one end pivoted to a respective arm and its other end connected to a chain tensioning device, a leaf spring of arcuate form associated with said cross-chains, other chains connecting with tensioning devices in series, a cam member having cam slots through which said arms pass, said member being arranged to rotate on the axis of the arm carrier and the cam slots being arranged to move the arms between normal and operative positions for the chains upon relative movement of the arm carrier and cam member, means to effect locking of the cam member against rotary movement, and other means to effect locking of the arm carrier to the wheel whereby the arm carrier may be moved relative to the cam member upon rotation of the wheel.

6. In an automobile, the combination with a wheel and its tire; of an arm carrier arranged beside the wheel and coaxial therewith, said arm carrier being supported for rotary movement on its axis, spaced arms pivoted to the peripheral portion of said arm carrier, tire chains carried by the free ends of said arms, said tire chains including cross-chains each having one end pivoted to a respective arm and its other end connected to a chain tensioning device, a leaf spring of arcuate form associated with said cross-chains, other chains connecting said tensioning devices in series, a cam member having cam slots through which said arms pass, said member being arranged to rotate on the axis of the arm carrier and the cam slots being arranged to move the arms between normal and operative positions for the chains upon relative movement of the arm carrier and cam member, said cam member having a pin hole therein, a manually controlled pin protractable into said pin hole to lock the cam member from movement and retractable from the pin hole to release the cam member for rotary movement, and means to effect locking of the arm carrier to the wheel whereby the arm carrier will rotate with the wheel.

7. In an automobile, the combination with a wheel and its tire; of an arm carrier arranged beside the wheel and coaxial therewith, said arm carrier being supported for rotary movement on its axis, spaced arms pivoted to the peripheral portion of said arm carrier, tire chains carried by the free ends of said arms, said tire chains including cross-chains each having one end pivoted to a respective arm and its other end connected to a chain tensioning device, a leaf spring of arcuate form associated with said cross-chains, other chains connecting said tensioning devices in series, a cam member having cam slots through which said arms pass, said member being arranged to rotate on the axis of the arm carrier and the cam slots being arranged to move the arms between normal and operative positions for the chains upon relative movement of the arm carrier and cam member, said cam member having a pin hole therein, a manually controlled pin protractable into said pin hole to lock the cam member from movement and retractable from the pin hole to release the cam member for rotary movement, a spring pressed pin carried by the arm carrier and registering with the pin hole upon the chains being in operative position, said spring pressed pin being adapted to enter said pin hole and lock the arm carrier and cam member together upon retraction of the manually operated pin, and means to effect locking of the arm carrier to the wheel whereby the arm carrier will rotate with the wheel.

8. In an automobile, the combination with a wheel and its tire; of an arm carrier arranged beside the wheel and coaxial therewith, said arm carrier being supported for rotary movement on its axis, spaced arms pivoted to the peripheral portion of said arm carrier, tire chains carried by the free end of said arms, said tire chains including cross-chains each having one end pivoted to a respective arm and its other end connected to a chain tensioning device, a leaf spring of arcuate form associated with said cross-chains, other chains connecting said tensioning devices in series, a cam member having cam slots through which said arms pass, said member being arranged to rotate on the axis of the arm carrier and the cam slots being arranged to move the arms between normal and operative positions for the chains upon relative movement of the arm carrier and cam member, said cam member having a pin hole therein, a manually controlled pin protractable into said pin hole to lock the cam member from movement and retractable from the pin hole to release the cam member for rotary movement, a spring pressed pin carried by the arm carrier and registering with the pin hole upon the chains being in operative position, said spring pressed pin being adapted to enter said pin hole and lock the arm carrier and cam member together upon retraction of the manually operated pin, and a second spring pressed pin mounted in the arm carrier to move between protracted position in the direction of the wheel and retracted position in the direction of the cam member, said second pin being urged by its spring towards retracted position and adapted to be held protracted by engagement with the cam member and movable with the arm carrier to register with said pin hole upon the chains being in normal position to permit retraction of the pin, said wheel having a pin hole into which the second pin enters in protracted position.

MORTIMER R. SIMON.
LOUIS LEVY.